US010977810B2

(12) United States Patent
Murphy-Chutorian et al.

(10) Patent No.: US 10,977,810 B2
(45) Date of Patent: Apr. 13, 2021

(54) CAMERA MOTION ESTIMATION

(71) Applicant: 8th Wall Inc., Palo Alto, CA (US)

(72) Inventors: Erik Murphy-Chutorian, Palo Alto, CA (US); Nicholas Butko, Cupertino, CA (US)

(*) Notice: Subject to any disclaimer, the term of this patent is extended or adjusted under 35 U.S.C. 154(b) by 0 days.

(21) Appl. No.: 16/211,455

(22) Filed: Dec. 6, 2018

(65) Prior Publication Data
US 2020/0184656 A1    Jun. 11, 2020

(51) Int. Cl.
*G06T 7/00* (2017.01)
*G06T 7/292* (2017.01)

(52) U.S. Cl.
CPC .... *G06T 7/292* (2017.01); *G06T 2207/10016* (2013.01); *G06T 2207/30204* (2013.01)

(58) Field of Classification Search
CPC ........... G06T 7/292; G06T 2207/10016; G06T 2207/30204
See application file for complete search history.

(56) References Cited

U.S. PATENT DOCUMENTS

| 10,043,076 | B1* | 8/2018 | Zhang | G06K 9/4671 |
| 2004/0218823 | A1* | 11/2004 | Kondo | H04N 19/23 |
| | | | | 382/239 |
| 2006/0078215 | A1* | 4/2006 | Gallagher | G06T 5/006 |
| | | | | 382/254 |
| 2009/0024353 | A1* | 1/2009 | Lee | G06T 7/73 |
| | | | | 702/153 |
| 2010/0045701 | A1* | 2/2010 | Scott | H04N 7/183 |
| | | | | 345/633 |
| 2010/0316282 | A1* | 12/2010 | Hope | G06T 7/55 |
| | | | | 382/154 |
| 2015/0186746 | A1* | 7/2015 | Martini | H04N 13/211 |
| | | | | 382/203 |
| 2015/0235099 | A1* | 8/2015 | Lee | G06K 9/00744 |
| | | | | 455/456.1 |
| 2018/0364731 | A1* | 12/2018 | Liu | G06K 9/00208 |

* cited by examiner

*Primary Examiner* — Ian L Lemieux
(74) *Attorney, Agent, or Firm* — Joseph L. Acayan

(57) ABSTRACT

Implementations generally relate to determining camera motion. In one implementation, a method includes capturing a first image and a second image of a physical scene with a camera in respective first and second positions. The method further includes determining first and second image points from the respective first and second image points. The method further includes determining first and second directions of gravity relative to the camera in the respective first and second positions. The method further includes determining a motion of the camera between the capturing of the first image and the capturing of the second image, wherein the determining of the motion of the camera is based at least in part on the first image points, the second image points, the first direction of gravity, and the second direction of gravity.

20 Claims, 10 Drawing Sheets

CAMERA MOTION ESTIMATION

BACKGROUND

In mapping, simultaneous localization and mapping (SLAM) is a technique for building and updating a map of an environment while tracking a location in the environment. SLAM uses handcrafted keypoint detection and two-dimensional image feature extraction techniques to track the world in real time. SLAM may be applied to various technologies such as virtual reality, augmented reality, mixed reality, tracking, mobile apps, unmanned vehicles, rovers, and robots.

SUMMARY

Implementations generally relate to determining camera motion. In one implementation, a method includes capturing a first image of a physical scene with a camera in a first position, where the physical scene includes physical feature points, and capturing a second image of the physical scene with the camera in a second position, where the first position and the second position are different. The method further includes determining first image points from the first image, and determining second image points from the second image. The method further includes determining a first direction of gravity relative to the camera in the first position, and determining a second direction of gravity relative to the camera in the second position. The method further includes determining a motion of the camera between the capturing of the first image and the capturing of the second image, where the determining of the motion of the camera is based at least in part on the first image points, the second image points, the first direction of gravity, and the second direction of gravity.

Other aspects and advantages of the described implementations will become apparent from the following detailed description, taken in conjunction with the accompanying drawings, illustrating by way of example the principles of the described implementations.

DETAILED DESCRIPTION

Implementations generally relate to localizing and mapping. Implementations enable a system such as a mobile device to determine the motion of its camera as the camera moves through a physical environment. As described in more detail herein, implementations provide a gravity-based two-point homography algorithm for six degrees of freedom camera motion estimation. A system may use the camera motion estimation to generate a virtual camera that moves in the same way as the physical camera. The system estimates camera motion based on successive photos taken by the camera and based on the direction of gravity. This enables the system to overlay digital objects onto a scene corresponding to the physical environment. Various implementations described herein may be applied to various technologies such as virtual reality, augmented reality, mixed reality, tracking, mobile apps, unmanned vehicles, rovers, and robots.

As described in more detail below, in various implementations, a system captures a first image and a second image of a physical scene with a camera in respective first and second positions. The system further determines first and second image points from the respective first and second image points. The system further determines first and second directions of gravity relative to the camera in the respective first and second positions. The system then determines first virtual points for the first image based on the first image points and the first direction of gravity. The system also determines second virtual points for the second image based on the second image points and the second direction of gravity. The system then determines the motion of the camera between the capturing of the first image and the capturing of the second image based at least in part on the first virtual points, the second virtual points, the first direction of gravity, and the second direction of gravity.

Figure 1:
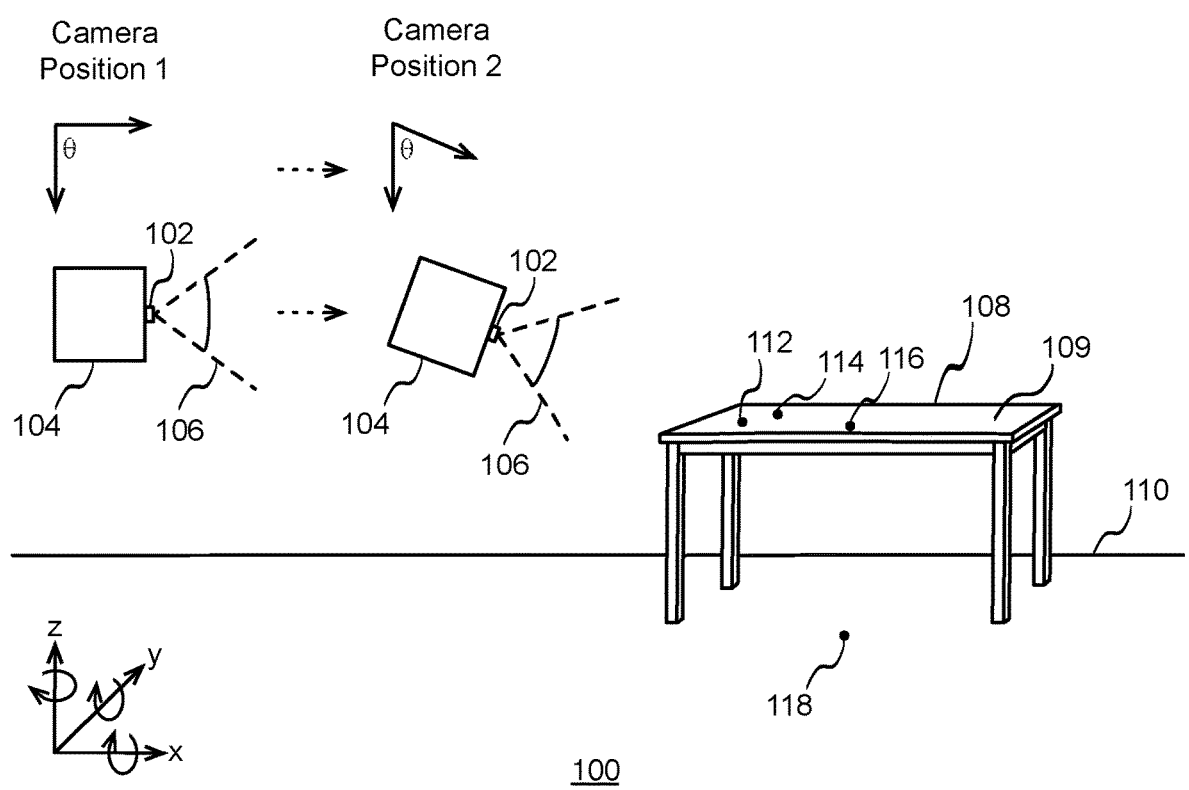
FIG. 1 illustrates a perspective-view diagram of an example physical environment, including a camera in a first position and in a second position relative to a surface of an example object, according to some implementations.

FIG. 1 illustrates a perspective-view diagram of an example physical environment 100, including a camera in a first position and in a second position relative to a surface of an example object, according to some implementations. As shown, a camera 102 is attached or integrated with a mobile unit 104. Mobile unit 104 may represent various items that have a camera. For example, mobile unit 104 may be a mobile device such as a cell phone, as well as a robot, a vehicle, a rover, etc.

Camera 102 has a predetermined field of view 106 through which camera 102 observes the physical environment 100 at any given moment, including objects in the physical world such as physical object 108, or object 108. Physical environment 100 may be may be an outdoor environment, an indoor environment, etc. In an example scenario, if physical environment 100 is an outdoor environment, object 108 may represent any object such as a piece of furniture (e.g., outdoor table), a building, the ground, etc. In another example scenario, if physical environment 100 is an indoor environment, object 108 may represent any object such as a piece of furniture (e.g., table), an appliance, etc. Other examples are possible. The particular object that object 108 represents may vary, and will depend on the particular scenario.

As shown, camera 102 is in a first position relative to object 108. For ease of illustration, only one example object is shown. In various scenarios, camera 102 may observe multiple objects in field of view 106.

In this example, object 108 has a flat horizontal surface 109. Object 108 may be a table for example that is resting on the ground 110. The object 108 has physical feature points 112, 114, and 116 on its surface 109. Also shown is a physical feature point 118 on the ground 110.

For ease of illustration, FIG. 1 shows an example subset of physical feature points. The actual number and location of physical feature points observed and tracked, and object(s) to which the physical feature points are associated will vary and will depend on the particular implementation. In other words, the example physical environment shown may not have all of the physical feature points shown and/or may have other physical feature points including physical feature points associated with other objects instead of, or in addition to, those shown herein.

As described in more detail herein, physical feature points 112, 114, 116, and 118 are distinguishable aspects of an object that are captured in an image. Example distinguishable physical feature points may include corners or angles of a region, contrasting features, etc. In various implementations, physical feature points 112, 114, and 116 may represent portions of an external surface of a given object (e.g., angles, corners, color variation such as wood grain knots on a wood or marble surface, etc.) As shown, physical feature points 112, 114, and 116 are on the same plane (on the top, horizontal surface 109 of object 108), and physical feature point 118 is on a different surface (on the ground 110).

As shown, the camera is initially in a first position (labeled Camera Position 1). Camera 102 subsequently moves to a second position (labeled Camera Position 2). In various implementations, camera 102 has six degrees of freedom (6DoF) of motion in the three-dimensional space. Specifically, camera 102 is free to move forward/backward (e.g., x translation along an x-axis), up/down (e.g., z translation along a z-axis), and left/right (e.g., y translation along an y-axis). Camera 102 is also free to rotate about the x-axis (x rotation or roll), the z-axis (z rotation or yaw), and the y-axis (y rotation or pitch). The particular label (e.g., "x", "y", "z", etc.) assigned to a given axis may vary and will depend on the particular implementation.

In this particular example, camera 102 translates across the x-axis and moves closer to object 108. In the first position, the line of sight of camera 102 is directed horizontally (e.g., angle θ=0 degrees). As camera 102 moves to the second position, camera 102 rotates about the y-axis such that the line of sight of camera 102 tilts downward (e.g., angle θ=−20 degrees). For ease of illustration, camera 102 moves in these two degrees of freedom. The camera may move in other degrees of freedom in other scenarios. For example, in other scenarios, camera 102 may move along the z-axis and/or the y-axis, or rotate about the x-axis and/or z-axis.

As described in more detail herein, a three-dimensional (3D) view of physical environment 100 may be projected into field of view 106 of camera 102 (e.g., via the camera lens of camera 102). Camera 102 may then capture images of the 3D view, including any objects in field of view 106 of camera 102. Camera 102 may capture images in multiple image frames as camera 102 moves within environment 100. For example, camera 102 may capture images in a successive burst of photos. Camera 102 may also capture a video recording with multiple image frames. Physical feature points such as physical feature points 112, 114, 116, and 118 may be projected into the view of camera 102, and captured in two-dimensional (2D) image frames.

As described in more detail herein, a neural network utilizes the position of camera 102 and physical feature points captured in the captured 2D image frames to determine the motion of camera 102 in physical environment 100. The neural network determines how camera 102 moves in three dimensions relative physical feature points through observations of the virtual feature points in 2D image frames captured by camera 102. Based on analysis of the virtual feature points in the image frames, the neural network determines the motion of camera 102. Example implementations associated with determining camera motion are described in more detail herein.

Figure 2:
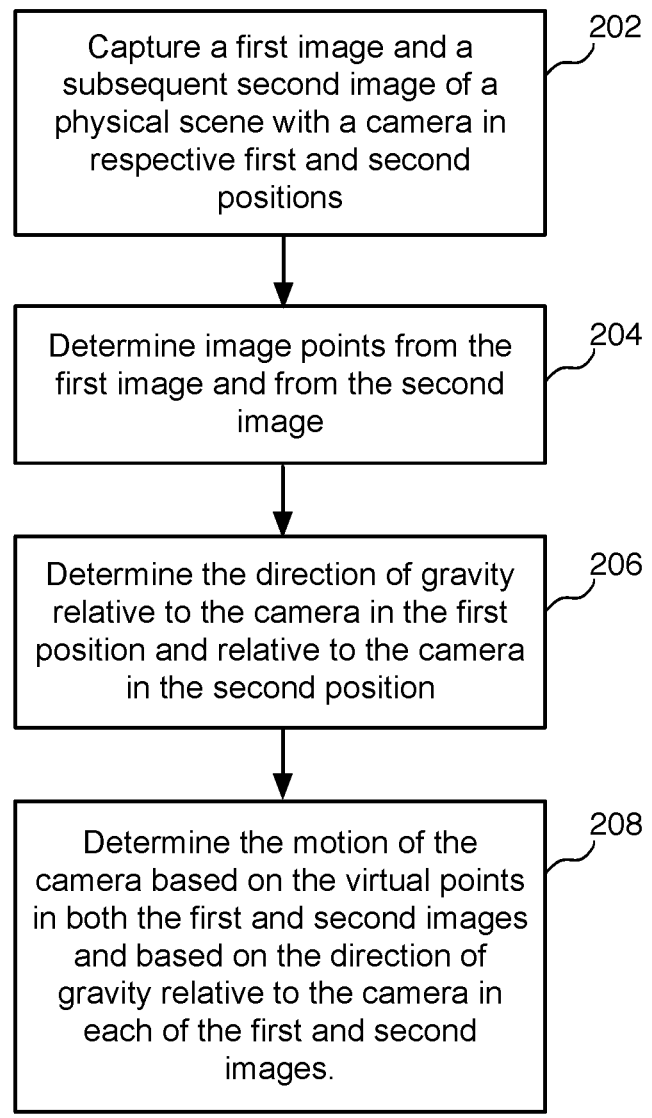
FIG. 2 illustrates an example flow diagram for determining the motion of a camera, according to some implementations.

FIG. 2 illustrates an example flow diagram for determining the motion of a camera, according to some implementations. Various implementations described herein improve the ability to determine the motion of a camera relative to physical feature points in a physical environment or scene. Referring to FIGS. 1 and 2, a method is initiated at block 202, where the system captures a first image of a physical scene with camera 102 in a first position, and captures a second image of the physical scene with camera 102 in a second position. For ease of illustration, example implementations involve two images—a first image and a second image. In various implementations, the system may capture any number of images in order to determine the motion of camera 102. As indicated herein and shown in FIG. 1, the physical scene (e.g., physical environment 100) includes physical feature points 112, 114, 116, and 118.

At block 204, the system determines image points from the first image and image points from the second image. In various implementations, the image points are feature points in the images, where the image points in the images correspond to physical feature points in the physical scene.

Figure 3A:
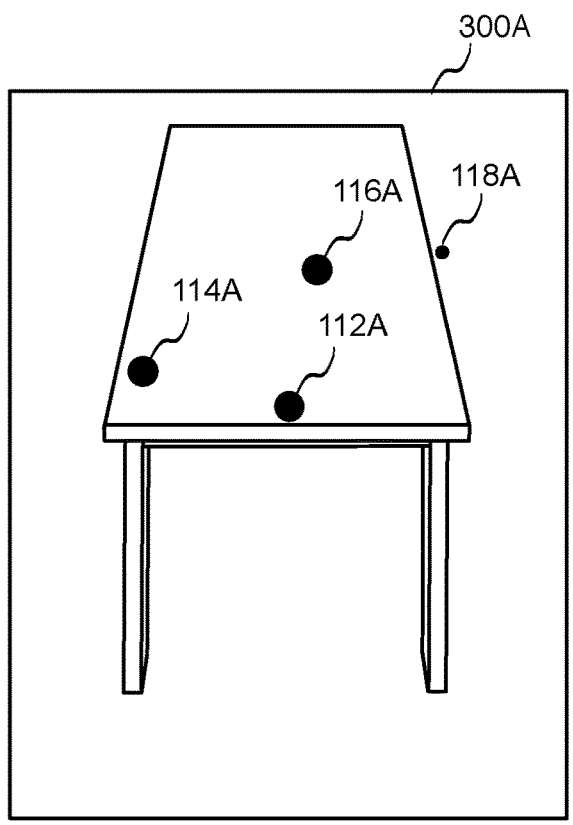
FIG. 3A illustrates an example image that includes example image points captured by the camera in a first position, according to some implementations.

FIG. 3A illustrates an example image 300A that includes example image points captured by the camera in a first position, according to some implementations. Shown are image points 112A, 114A, 116A, and 118A, which are digital image representations of physical feature points 112, 114, 116, and 118 of FIG. 1.

Figure 3B:
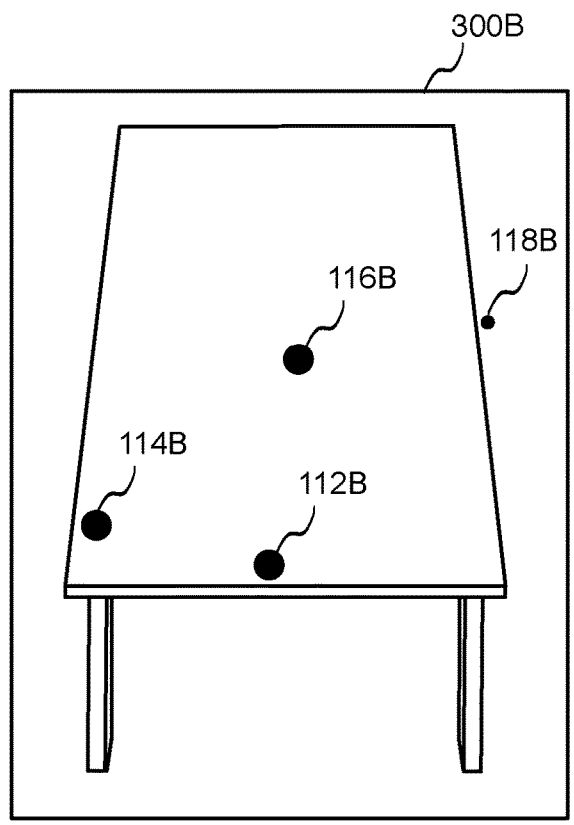
FIG. 3B illustrates an example image that includes example image points captured by the camera in a second position, according to some implementations.

FIG. 3B illustrates an example image 300B that includes example image points captured by the camera in a second position, according to some implementations. Shown are image points 112B, 114B, 116B, and 118B, which are also digital image representations of physical feature points 112, 114, 116, and 118 of FIG. 1.

At block 206, the system determines the direction of gravity relative to camera 102 in the first position, and determines the direction of gravity relative to camera 102 in the second position. In various implementations, the system determines the direction of gravity relative to camera 102 in each image (e.g., image 300A and image 300B). The mobile unit 104 (e.g., mobile device) includes an accelerometer that senses the direction of gravity. The system may query gravity data from inertial measurement unit 1012 to determine the direction of gravity relative to camera 102. As such, the system may also determine the position of camera 102 relative to the ground or any surface (e.g., surface 109 of object 108) that is parallel to the ground. The system may also determine coordinates of the surface or plane based on the direction of gravity. In various implementations, camera 102 is integrated into mobile unit 104. As such, the system may also determine the direction of gravity relative to mobile unit 104. As described in more detail herein in connection with FIG. 6, the system may also use knowledge of gravity to determine the motion of camera 102 in the physical environment. In various implementations, the system may use an inertial measurement unit to determine the direction of gravity relative to mobile unit 104. In some implementations, the inertial measurement unit may use one or more accelerometers to determine the direction of gravity relative to mobile unit 104. In addition to accelerometers, the system may also use one or more gyroscopes and/or one or more magnetometers to more accurately track changes in the direction of gravity.

As shown in the example of FIG. 1, camera 102 translates across the x-axis and moves closer to object 108. In the first position, the line of sight of camera 102 is directed horizontally (e.g., angle θ=0 degrees). As camera 102 moves to the second position, camera 102 rotates about the y-axis such that the line of sight of camera 102 tilts downward (e.g., angle θ=-20 degrees). By determining the direction of gravity, the system is able to determine the angle of gravity relative to the coordinate system of the phone (e.g., -20 degrees, 0 degrees, 10 degrees, etc.).

As shown, the first image 300A and the second image 300B are different, because the first position and the second position of camera 102 are different. As described above, camera 102 moves in the physical environment from the first position to the second position, closer to the physical feature points. As such, image points 112B, 114B, 116B, and 118B in the second image appear closer in image 300B than image points 112A, 114A, 116A, and 118A in the first image 300A.

In various implementations, the system determines the image points of images 300A and 300B that correspond to the physical feature points that lie on the same plane or surface 109. The system then selects a particular subset of image points that lie on the same plane to determine the motion of camera 102.

In various implementations, the physical feature points and corresponding image points are initially unknown and discovered by the system in real-time as camera 102 travels in the physical environment. In various implementations, a neural network of the system determines the one or more physical feature points in the physical environment as camera 102 moves in the physical environment by analyzing the corresponding image points in the images.

In various implementations, the system extracts the image points from first image 300A using keypoint detection. During keypoint detection, the system searches an image frame to find distinguishable image points in the image frame, where the image points are stable and repeatable across image frames. Example distinguishable image points may include corners or angles of a region, contrasting features, etc. The system identifies the same image points across different image frames taken by camera 102 over time as camera 102 travels through the physical environment. Image points may represent areas of high texture in x-direction and/or y-direction and/or z-direction. Such feature points may represent edge boundaries and/or other high-contrast and/or other landmarks or portions of objects in the physical environment. The terms feature point, keypoint, and map point may be used interchangeably.

In some implementations, feature points may have associated pixel coordinates in a pixel map. Also, the system may generate a point cloud, which is a set of data points in space, and the point cloud may represent the physical environment (e.g., physical environment 100). Once a given feature point is added to the point cloud space, the system may or may not track the image point in subsequent image frames.

In some implementations, the system may maintain a predetermined number of image points in the point cloud space, where the system maintains the most salient image points. In some implementations, the system may filter or remove the least salient map points in order to store the most salient map points. Also, in some implementations, if the system is analyzing image points in the same plane in the environment (e.g., image points 112A, 114A, and 116A, etc. on top surface 109 of object 108), the system may filter or remove image points on other planes (e.g., image point 118A on the ground 110).

As described in more detail herein, implementations use a neural network to detect the image points in the images. As described in more detail below in connection with FIG. 9, a neural network is a network of processors connected by unidirectional communication channels. The neural network uses the information associated with the image points and the direction of gravity to determine how the camera moves between positions corresponding to the images.

In various implementations, having the neural network perform the keypoint detection provides improved results, because the neural network factors in various types of positional information of the camera. In some implementations, the system may determine one or more image points that may be based on means such as raw image pixels. The particular technique may vary and will depend on the particular implementation. Example implementations of a neural network are described in more detail herein.

In various implementations, the system may determine virtual feature points from the extracted image points of first image 300A and second image 300B. Virtual feature points may also be referred to as virtual image points, or simply virtual points. Example implementations directed to the generation of virtual feature points and their use are described in more detail below.

Referring still to FIG. 2, at block 208, the system determines the motion of camera 102 between the capturing of first image 300A and the capturing of second image 300B. As described in more detail herein, the system determines the motion of camera 102 based at least in part on the image points in first image 300A, the image points in second image 300B, the direction of gravity relative to the camera in the first position, and the direction of gravity relative to the camera in the second position. In various implementations, the system determines the motion of camera 102 based on point correspondences between image points from first image 300A and image points from second image 300B. As described in more detail below, in some implementations, the system may also system determine the motion of camera 102 based at least in part on virtual points derived from the image points of first image 300A and second image 300B.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 4:
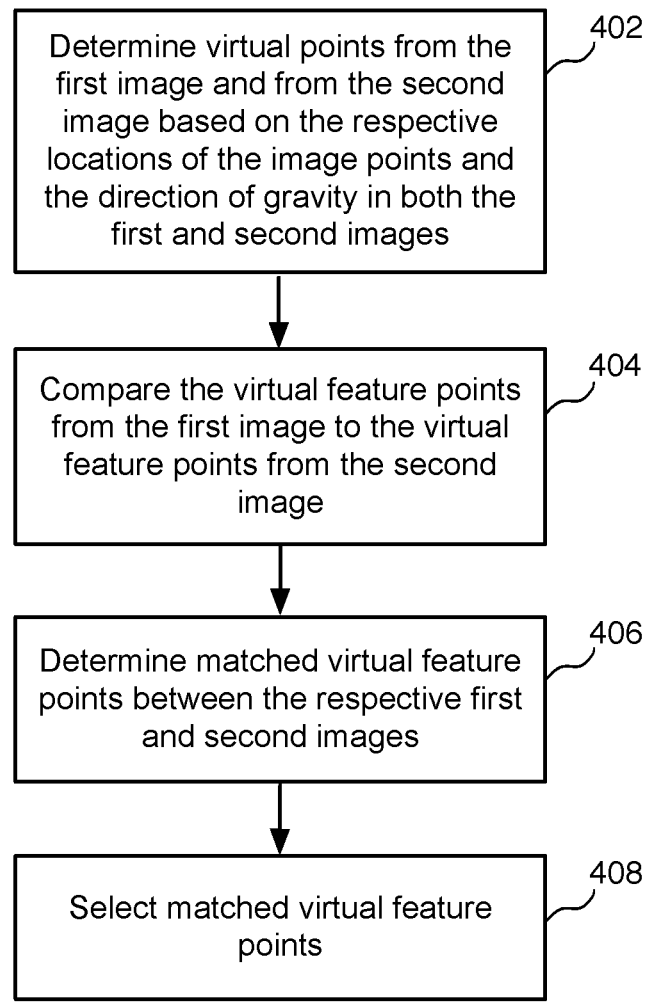
FIG. 4 illustrates an example flow diagram for selecting virtual feature points, according to some implementations.

FIG. 4 illustrates an example flow diagram for generating and selecting virtual feature points, according to some implementations. As indicated above, in various implementations, the system may also determine the motion of the camera based at least in part on the motion of virtual feature points derived from the first image and the second image and based on the direction of gravity relative to the camera in each of the first and second images. As described in more detail below, the system generates and selects virtual feature points from images 300A and 300B, where the virtual feature points correspond to the physical feature points that lie on the same plane or surface. The system may also use these virtual feature points to determine the motion of camera 102.

In various implementations, a method is initiated at block 402, where the system determines virtual feature points from first image 300A and determines virtual feature points from second image 300B. In various implementations described herein, the system generates or constructs virtual points by applying a mathematical transformation to image points based in part on the direction of gravity. Various implementations may or may not explicitly represent virtual points as new points, and may instead apply the transformation implicitly or indirectly as part of some other mathematical expression. For example, in one implementation, for explicit conversion, the system may compute virtual points by applying a mathematical function to the extracted image points such that the image points are in new positions. In another example implementation, for implicit conversion, the system may compute virtual points by applying a mathematical function to every point in the image and extract feature points from that transformed image. In other words, applying an image warp (e.g., an affine warp or transformation, etc.) prior to applying image point extraction. In some implementations, operations on image points may apply to virtual points as well.

In various implementations, the system may change the order of processing to perform certain computations on image points or on virtual points. For example, the system may apply image descriptors and point matching before or after the transformation is applied. The system may apply virtual point transformation to a subset of the extracted image points (e.g., after feature selection). Alternatively, the system may apply virtual point transformation to every point in the image by performing an affine warp before image features are extracted.

In various implementations, on a high level, the system may apply various robust estimation techniques to determine the motion of the camera: (1) transforming image points to virtual feature points with a virtual camera pointed straight down; (2) extracting the in-plane camera rotation and 3-DoF camera translation from a pair of points; (3) recovering the true camera motion (up to a scale factor) by reversing the gravity adjustments to the virtual camera; (4) constructing a homography matrix from the recovered motion; and (5) validating the recovered motion with a statistical test by applying the homography transform to all point matches. If the recovered motion is invalid, the system may go back to (2) extracting the in-plane camera rotation and 3-DoF camera translation with a new pair of points. Further, implementations directed to determining a robust estimate of the motion of camera 102 are described in detail below in connection with FIG. 6.

By knowing the virtual feature points on a flat surface (same plane), the system precisely estimates the camera motion between the two image frames up to a scale factor. In some implementations, the direction of the translation is known and its magnitude is not known.

In some implementations, the system may also determine the distance between camera 102 and object 108 based on various implementations such as the direction of gravity and at least four degrees of freedom of the camera, for example. In some implementations, the true camera motion can be recovered.

In various implementations, the system may generate a virtual camera and virtual objects, and may navigate the virtual camera through the physical environment in the same way a physical camera would navigate through the same virtual environment. As such, the virtual objects appear locked to physical surfaces in the 3D physical space.

Implementations have various applications. For example, implementations may be used in connection with self-driving vehicles, where the system on a self-driving vehicle may track its motion along the road. Implementations may be used to detect other vehicles, pedestrians, road signs, obstacles such as debris, potholes, etc.

While implementations are described herein in the context of motion of a camera, these implementations and others may also apply to any object or person associated with the camera. For example, as indicated herein, camera 102 may be attached to or integrated into another device such as a mobile device (e.g., smart phone, etc.). As such, the determination of the motion of camera 102 may be extended to the position of the mobile device. Similarly, from a user perspective, the determination motion may be extended to the position of the user holding or wearing the mobile device that has camera 102 attached or integrated into it.

Referring still to FIG. 4, at block 404, the system compares the first virtual feature points from the first image to the second virtual feature points from the second image. In various implementations, the system measures the difference between each virtual feature point in a first image frame and different virtual feature points in a second image frame. Each difference between two virtual feature points may be referred to as a motion vector. In some implementations, a given motion vector has a length and a direction. In some implementations, the system may extract the motion vector after constructing virtual image points with a virtual camera pointed at the ground. In some implementations, the system may extract the motion vector first and then the motion vectors can be imaged with the virtual cameras.

In various implementations, the system computes the motion vectors from the relative position of a matched point in two images. A given point may be matched by comparison of statistics of local regions around image points in both images.

Figure 5:
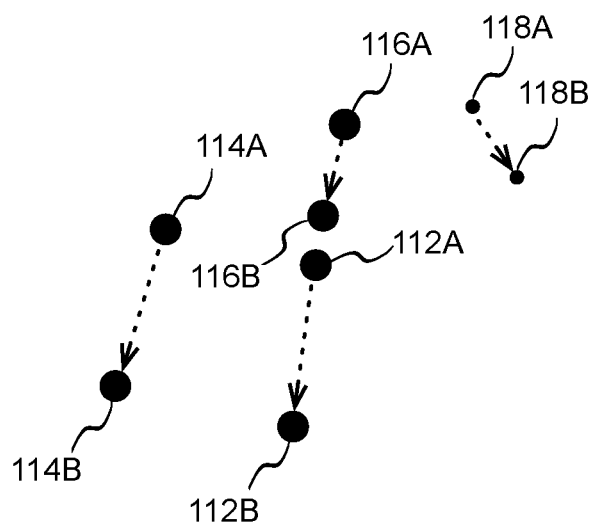
FIG. 5 illustrates a comparison between virtual feature points from the first image and virtual feature points from the second image, according to some implementations.

FIG. 5 illustrates a comparison between virtual feature points from the first image and virtual feature points from the second image, according to some implementations. Shown are virtual feature points 112B, 114B, 116B, and 118B from second image 300B overlaid on virtual feature points 112A, 114A, 116A, and 118A from first image 300A.

At block 406, the system determines matched first virtual feature points and second virtual feature points, where matched virtual feature points from two different images correspond to the same physical feature points in the physical environment 100. For example, virtual feature point 112A and virtual feature point 112B are matched virtual feature points, because they represent the same physical feature point 112 but from two images captured from two different camera positions. As shown in FIG. 5, the system determines that virtual feature point 112A matches virtual feature point 112B, virtual feature point 114A matches virtual feature point 114B, virtual feature point 116A matches virtual feature point 116B, and virtual feature point 118A matches virtual feature point 118B.

In various implementations, the system determines matched virtual feature points, where the matched virtual feature points are on a same plane such that the plane is perpendicular to the direction of gravity (e.g., flat or level). The system determines whether or not the virtual feature points are on a same plane. As such, when tracking between camera frames, the system may reliably determine which virtual feature points are on a flat surface or not, which virtual feature points are on different objects, etc. In various implementations, virtual feature points on the same plane will move together to a greater degree than virtual feature points on a different plane. As such, the system determines which motion vectors are most consistent in both length and direction. For example, the system determines that matched virtual feature points 112A and 112B, matched virtual feature points 114A and 114B, matched virtual feature points 116A and 116B are all on the same plane (e.g., on the top surface 109 of object 108). These pairs of virtual feature points move in a consistent way (e.g., direction) between image 300A and 300B. Motion vector between virtual feature points 116A and 116B is shorter than the motion vectors between virtual feature points 112A and 112B, and virtual feature points 114A and 114B. This would be expected however, because the corresponding physical feature point 116 is further from camera 102 than corresponding physical feature points 112 and 114. Thus, the motion vector is smaller. In various implementations, the system uses both magnitude and direction of each motion vector in order to determine consistency of motion. As such, the system may determine if the motion vector for virtual feature points 116A and 116B is different from the motion vector for virtual feature points 118A and 118B. The system may then determine that virtual feature points 116A and 116B are on a different plane from virtual feature points 118A and 118B.

The system determines that matched virtual feature points 118A and 118B are on a different plane (e.g., on ground 110), because, when comparing their positions and size differences in images 300A and 300B, it is shown that they move differently (e.g., different direction) from the other virtual feature points. In some implementations, the system may handle feature points of different sizes by basing calculations on estimations of the center of the feature points.

In some scenarios, there might be small objects on the surface of interest. For example, objects could be small enough to be considered feature points on the same plane (e.g., a piece of paper or a pencil). There may also be large objects that are big enough to be on a different plane (e.g., a vase). In some implementations, the system may determine that the small objects are on different plane from large objects.

The way that each set of pairs of matched virtual feature points moves across a plane may be referred to as a motion profile. In some implementations, this motion profile may be represented as a homography matrix. The pairs of matched virtual feature points within a given set (on the same plane) will move in a consistent manner. For example, the motion profile of the virtual feature points on surface 109 of object 108 will be different from the motion profile of the virtual feature points on the ground. The system would determine that surface 109 and the ground are separate planes.

At block 408, the system selects pairs of matched first virtual feature points and second virtual feature points. In some implementations, the system selects pairs of matched virtual feature points that are on the same plane. In some implementations, the system selects a subset of the pairs of matched virtual feature points that are on the same plane. The reduced number of selected pairs of matched virtual feature points is beneficial, because the system may estimate the motion of camera 102 faster and more reliably.

In some implementations, the system selects exactly two pairs of matched first virtual feature points and second virtual feature points, though other numbers of pairs are possible. The score may be determined by checking how consistent the motion profile is with other sets of points. In some implementations, the system initially selects two random pairs of matched virtual feature points. The system then determines a score for the pair. The system then iteratively selects other pairs matched virtual feature points, and determines a score for each pair. In some implementations, the system may select the two highest-ranking pairs of matched virtual feature points.

In some scenarios, at the time two points are selected, it is not known if they are on the same plane. In various implementations, the system scoring them for coherent motion with other points helps to determine whether they are on the same plane.

In some implementations, the system ignores the virtual feature points that are not on the same plane (e.g., virtual feature points 118A and 118B). In some implementations, the system may select matched pairs of virtual feature points from those that indeed lie in the same plane based at least in part on confidence levels. For example, in some implementations, the confidence level may represent the confidence that a given virtual feature point is valid (e.g., that the given virtual feature point indeed exists or still exists). In some implementations, the confidence level of a given virtual feature point may change over time. For example, the system may raise the confidence level of a given map point if the virtual feature point is found during a search of a subsequent image frame. Conversely, the system may lower the confidence level of a given virtual feature point if the virtual feature point is not found during a search of a subsequent image frame. For example, if a given virtual feature point is found in a previous image frame but not found in the current image frame, the system lowers the confidence level of that map point. For example, an object such as a pet or bird may come into view of camera 102, but temporarily. As such, map points associated with such a fleeting object are not valid when the object substantially changes positions and/or leaves the view of camera 102. In some implementations, the system compares the confidence level to a predetermined confidence threshold. In various implementations, the system removes each of the map points that have a confidence level that falls below the predetermined confidence threshold.

Figure 6:
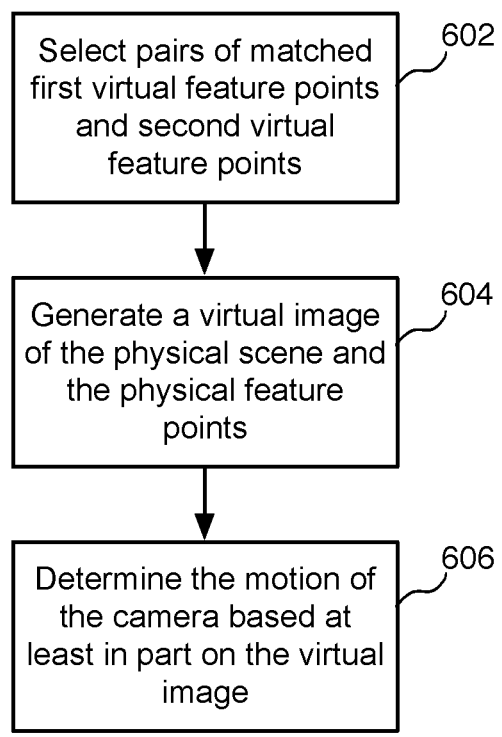
FIG. 6 illustrates an example flow diagram for generating a virtual image and determining the motion of a camera from the virtual image, according to some implementations.

FIG. 6 illustrates an example flow diagram for generating a virtual image and determining the motion of a camera from the virtual image, according to some implementations. In various implementations, the system applies a homography transformation to images 300A and 300B to generate a virtual image, which is then used to determine the motion of camera 102. In various implementations, this homography for generating the virtual feature points is a different motion profile than the one extracted above.

In various implementations, a method is initiated at block 602, where the system selects pairs of matched first virtual feature points and second virtual feature points. In some implementations, the system selects the pairs of virtual feature points as described in example implementations described above in connection to FIG. 4.

In some implementations, determining whether points exhibit coherent motion and are on the same plane may be done with robust estimation techniques, such as random sample consensus (RANSAC) or least median of squares (LMedS) estimation. In some implementations, robust estimation may be achieved by scoring a predetermined number of point pairs based on the expected level of noise and the desired level of confidence in a good result. For example, to achieve a good motion estimate with 99.9% probability, and if it is expected that 30% of detected feature point matches are good matches and the matched points will lie on a horizontal surface, the system may randomly select 73 pairs of points to score for coherent motion with the remaining points and choose the motion profile from the best pair among the randomly selected pairs.

At block 604, the system hallucinates or generates a virtual image of the physical scene and the physical feature points and the direction of gravity. The motion profile for rotating a camera to face the ground points is applied to the extracted image points. This generates the virtual feature points.

Figure 7:
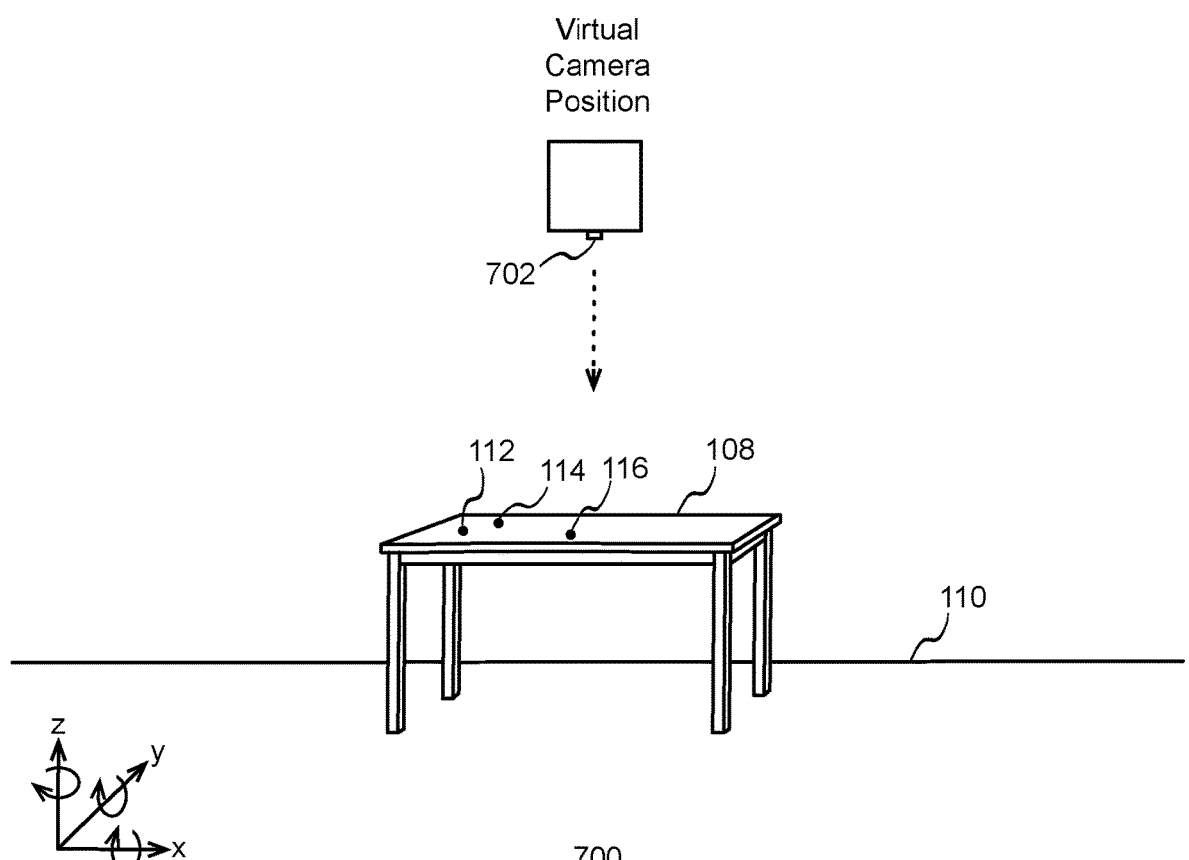
FIG. 7 illustrates a perspective-view diagram of an example virtual environment and a virtual camera, according to some implementations.

FIG. 7 illustrates a perspective-view diagram of an example virtual environment and a virtual camera, according to some implementations. Shown are physical feature points 112, 114, and 116 on surface 109 of object 108. In some implementations, the system determines a view or perspective of physical feature points 112, 114, and 116 as if the line of sight of a virtual camera 702 were directed downward parallel to the direction of gravity. In various implementations, the system generates a virtual image of the physical scene and the physical feature points such that the line of sight of the virtual image is perpendicular to the direction of gravity. In other words, the vanishing point is straight down in the direction of gravity. As such, in various implementations, the line of sight of camera 102 is perpendicular to the plane of virtual feature points 112C, 114C, and 116C of FIG. 8.

In various implementations, a homography transformation may be used for different purposes. For example, a homography transformation may be used to generate the virtual image. A homography transformation may also be used to determine the camera motion.

In various implementations, a homography transformation is matrix multiplication from one coordinate to another coordinate (e.g., from virtual feature point 112A to virtual feature point 112B). As indicated herein, the system detects physical feature points (e.g., physical feature points 112, 114, and 116) that lie on a flat plane of object 108 (e.g., top surface of a table, etc.). The system then captures the physical feature points in two image (e.g., virtual feature points 112A, 114A, and 116A, and virtual feature points 112B, 114B, and 116B). The images are taken from two camera positions, as shown the examples described herein.

As indicated herein, the system may use knowledge of gravity to hallucinate a rotation of the scene. In some implementations, the system computes the homography motion model for a camera rotation that would point a camera at the floor. The system then applies the motion model to the extracted image points.

Figure 8:
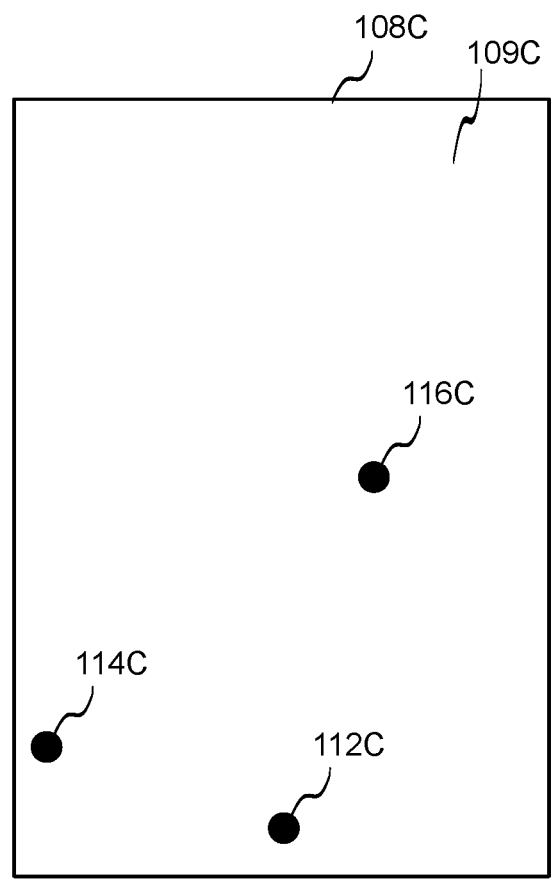
FIG. 8 illustrates an example virtual image taken by a virtual camera positioned over virtual feature points, according to some implementations.

FIG. 8 illustrates an example virtual image 800 taken by a virtual camera positioned over virtual feature points, according to some implementations. As shown, virtual feature points 112C, 114C, and 116C are positioned on the surface 109C of a virtual object 108C representing physical object 108 of FIG. 1, where virtual feature points 112C, 114C, and 116C correspond to physical feature points 112, 114, and 116 of FIG. 1. Also, the perspective distortion present in images 300A and 300B is not present in the virtual image 800.

At block 606, the system determines the motion of the camera based at least in part on the virtual image. In some implementations, the system constructs two line segments from a pair of points. The system then determines in-plane translation from the motion of the line center, depth translation from the change in line length, and in-plane rotation from the change in angle. Other techniques such as singular value decomposition (SVD) may also be used.

In various implementations, the system determines the motion of camera 102 based on changes in parameter values associated with 6 degrees of freedom between the first position of the camera when capturing the first image and the second position of the camera when capturing the second image. As indicated above, 6 degrees of freedom refers to the freedom of movement or motion in 3D space, where a body such as camera 102 is free to move in three perpendicular axes (e.g., forward, backward, up, down, left, and right) and/or rotate about three perpendicular axes (e.g., pitch, yaw, and roll).

In various implementations, the determining of the motion of the camera is based on changes in parameter values associated with 4 degrees of freedom between the first position of the camera when capturing the first image and the second position of the camera when capturing the second image. In various implementations, the 4 degrees of freedom include translational motion along the x-axis (e.g., left/right), translational motion along the y-axis (e.g., up/down), translational motion along the z-axis (e.g., forward/backward), and rotational motion about the z-axis (e.g., yaw).

In various implementations, the system need not estimate the two other degrees of motion—rotational motion about the x-axis (e.g., roll) and rotational motion about the y-axis (e.g., pitch). This is because the system already knows the direction of gravity from the accelerometer. The system need not estimate the rotational motion about the x-axis and y-axis. In various implementations, one purpose of the virtual feature points is to eliminate 4 of the 8 degrees of freedom required in traditional approaches.

In some implementations, in addition to estimating 4 degrees of freedom, the system determines 3 other parameters governing the surface on which the physical feature points are located. As such, instead of estimating 9 parameters, the system estimates only 6 parameters total in order to determine the motion of the camera, which is faster and more reliable than conventional techniques. Typical homography systems estimate 8 degrees of freedom: 6 DoF camera motion between two frames, plus 2 for the orientation of a tracked frame relative to the camera. The system removes the need to estimate the 2 degrees of freedom for the tracked plane as well as two degrees of freedom for the camera motion.

Implementations are advantageous over conventional techniques, because estimating fewer degrees of freedom parameters (e.g. 4 instead of 8 degrees of freedom) results in faster computation times (e.g., fewer steps) and also results in higher accuracy (e.g., fewer errors). As a result, the system determines the true camera motion faster and with a much higher degree of reliability than conventional techniques.

In some implementations, the system reprojects the motion model to be non-gravity aligned. In other words, the system takes the motion model for gravity aligned cameras and transforming them to a motion model for the actual cameras (non-gravity aligned). In some implementations, the system finds a motion model with a good score for many point pairs, which may be referred to as robust estimation.

As described in more detail herein, in various implementations, the system uses a neural network to determine motion information. The neural network determines motion information in 2D space and 3D space. Example implementations directed to a neural network determining motion information associated with one or more of the virtual feature points are described in more detail herein in connection with FIG. 6.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 9:
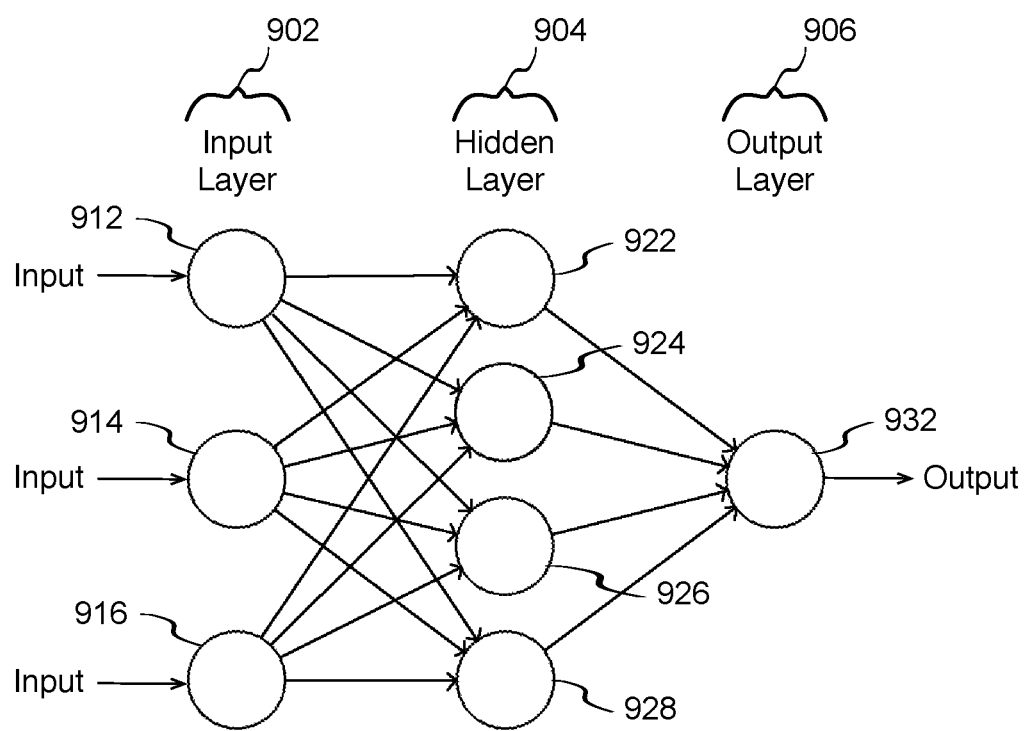
FIG. 9 illustrates a block diagram of an example neural network, which may be used for some implementations described herein.

FIG. 9 illustrates a block diagram of an example neural network 900, which may be used for some implementations described herein. Various implementations described herein, including the determination of the motion of the camera is performed by neural network 900. In various implementations, as information flows through neural network 900, neural network 900 adapts or learns based on the information each node receives. As such, neural network 900 is a computational model based on the structure and functions of biological neural networks. Neural network 900 may also be referred to as an artificial intelligence neural network or neural net.

As shown, neural network 900 has an input layer 902, a hidden layer 904, and an output layer 906. Input layer 902 includes input nodes 912, 914, and 916. Hidden layer 904 includes hidden nodes 922, 924, 926, and 928. While one hidden layer is shown, there may be zero hidden layers, one hidden layers, or more than one hidden layer. Output layer 906 includes output node 932.

In various implementations, the nodes of neural network 900 are connected by unidirectional communication channels or connections, which carry numeric data. In some implementations, the nodes operate on their local data and on the inputs they receive via the connections.

In various implementations, neural network 900 receives at its input nodes 912, 914, and 916 from various inputs associated with map points. For example, in various implementations, input to neural network 900 includes images such as digitized 2D image frames captured by a camera. For example, such digital images may include images 300A and 300B of FIG. 3.

In various implementations, neural network 900 may receive at its input nodes 912, 914, and 916 other types of information associated with a camera. For example, in some implementations, input to neural network 900 may also include inertial information associated with a camera. In some implementations, the inertial information may include gyro information provided by one or more gyro sensors, acceleration information provided by an accelerometer, compass information provided by a compass, and other types inertial information. In some implementations, the inertial information may be used to determine translational and/or rotational changes of a camera. In some implementations, input to neural network 900 may also include depth information provided by one or more depth sensors, and other information associated with one or more virtual feature points in images captured by a camera. Neural network 900 may use any combination of these types of inputs including sensor information independently, in addition to, or in lieu of visual information such as image frames.

In various implementations, hidden nodes 922, 924, 926, and 928 each have an output that is connected to the inputs of other nodes, which may include other hidden nodes or output nodes. Hidden nodes are hidden in that they not visible as a network output. Based on the various inputs, hidden nodes 922, 924, 926, and 928 determine 2D and 3D changes in positional information. As indicated herein, in various implementations, information associated with 3D changes in the 3D environment inherently includes information associated with 2D changes in 2D windows of image frames. For example, such changes may include changes to six degrees of freedom variables of one or more map points, as well as changes in other variables associated with one or more physical feature points (e.g., changes in inertial information, changes in depth information etc.).

Neural network 900 determines actual motion of a camera within the 3D environment from 2D digitized image frames and/or other sensor information (e.g., inertial information, depth information, and other information input to neural network 900, etc.). In other words, neural network 900 determines not merely motion within the 2D image frames but also other information in the real world, such as 3D motion and changes in 3D positional information associated with physical feature points in the physical environment.

Referring to images 300A and 300B, neural network 900 may determine any translational motion of camera 102. For example, neural network 1000 may determine that camera 102 has moved closer to object 108 by a particular distance (e.g., 4 feet, etc.). Neural network 1000 may determine any rotational motion of camera 102. For example, neural network 900 may determine that camera 102 has rotated relative to object 108 by a particular number of degrees (e.g., 20 degrees, etc.). These are example changes in the position of camera 102 relative to object 108. The actual amount of change and what variables change (e.g., six degrees of freedom variables) may vary, and will depend on the particular implementation.

In various implementations, hidden nodes 922, 924, 926, and 928 of neural network 900 may determine various information associated with one or more physical feature points in the physical environment. For example, hidden nodes 922, 924, 926, and 928 may determine any motion information, including what positional information (e.g., positional variables, etc.) that has changed, and the amount of change. In various implementations, hidden nodes 922, 924, 926, and 928 of neural network 900 perform their functions in parallel, which increases performance. Outputs provided by hidden nodes 922, 924, 926, and 928 may be referred to as intermediate outputs.

In various implementations, neural network 900 automatically learns and automatically reconciles information from visual and sensor data from camera 102 and/or one or more sensors. For example, neural network 900 may combine visual or sensor information that corroborates, where information corroborates if the information is consistent. Neural network 900 may ignore visual or sensor information that does not corroborate, where information does not corroborate if the information is not consistent.

As described in more detail herein, neural network 900 may predict all the virtual feature points that may be relevant in subsequent image frames. Such information may be used to remove jitter and or any shakiness in a given image frame.

As described in more detail herein, in various implementations, output node 932 of neural network 900 outputs a self-position of camera 102 in the physical environment, as wells changes in position (motion) of camera 102 in the physical environment from the capturing of one image to the next. In various implementations, neural network 900 outputs higher quality estimates of total global motion based on the motion information.

For ease of illustration, FIG. 9 shows neural network 900 as having three inputs 912, 914, and 916, four hidden nodes 922, 924, 926, and 928, and one output node 932. Neural network 900 may have any number of input nodes, hidden nodes, and output nodes, and the particular numbers will depend on the particular implementation. Similarly, FIG. 9 shows neural network 900 as having one hidden layer. Neural network 900 may have any number of hidden layers, and the particular number will depend on the particular implementation. In various implementations, neural network 900 may not have all of the components shown and/or may have other elements including other types of nodes and other types of layers instead of, or in addition to, those shown herein.

In some implementations, neural network 900 is a recurrent neural network. In various implementations, a recurrent neural network has "memory" in that the recurrent neural network uses information from previous network evaluations as inputs to the network for future evaluations. In the context of implementations described herein, a recurrent neural network may be used to implicitly remember appearance information about points in the map point space that are being tracked. A recurrent neural network may also be used to remember motion patterns and model the active motion characteristics (e.g., velocity, acceleration, jitter, etc.).

In some implementations, neural network 900 is a convolutional neural network. In various implementations, a convolutional neural network has convolutional layers within the network, where each convolutional layer may be a function applied to a subwindow around that position in the prior layer. The functions may be trained to be identical throughout the layer. In various implementations, the functions may be 2D feature patches that provide representational information about 2D images.

In some implementations, the determining of motion information is based on training of the neural network. Such training may facilitate neural network 900 in understanding local movement of various virtual feature points between image frames. For example, training may facilitate neural network 900 in interpreting observed behaviors associated with six degrees of separation and how such behaviors manifest in the physical environment.

In various implementations, training may include providing ground truth to the neural network (known inputs and outputs). Through optimized gradient descent and similar techniques, training may also include adjusting network weights such that a provided input activates the neural network to produce the provided output (or close to it).

In various implementations, ground truth for the system may be generated in any of the following ways. In some implementations, the system may render realistic, synthetic 3D scenes (e.g., computer graphics) along with the corresponding 3D depth information, and generate videos of a synthetic camera moving through the scene. This visual data may be used to train a system that learns to recognize motion from the synthetic video. This approach may be augmented by including synthetic sensor data as well (e.g., gyro, accelerometer, etc.) by mimicking the real motion and adding noise to the measurements.

In some implementations, the system may use an alternative (and possibly slow but accurate) SLAM system to generate the ground truth. For example, the system may capture video and sensor data coming from a cell phone or other capture device. This data may be passed to a conventional SLAM system that computes the motion output. This computed output along with the captured input may be used as ground truth to train the network. Since the ground truth data does not have to be computed in real time, the conventional SLAM system may be run in a slow (non-real time) but high-accuracy, high-computation mode to ensure the quality of the computed output is good.

In some implementations, the system may capture ground truth data with a specialized hardware system or hardware device. In various implementations, the hardware system or hardware device is configured for high accuracy. For example, the sensor and video input data may be captured by a hardware device such as a cell phone, which is itself being tracked by a cinematic motion capture system to determine the highly accurate ground truth data such as exact position and motion of the hardware device. Such truth data may then be inputted into the neural network for training.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 10:
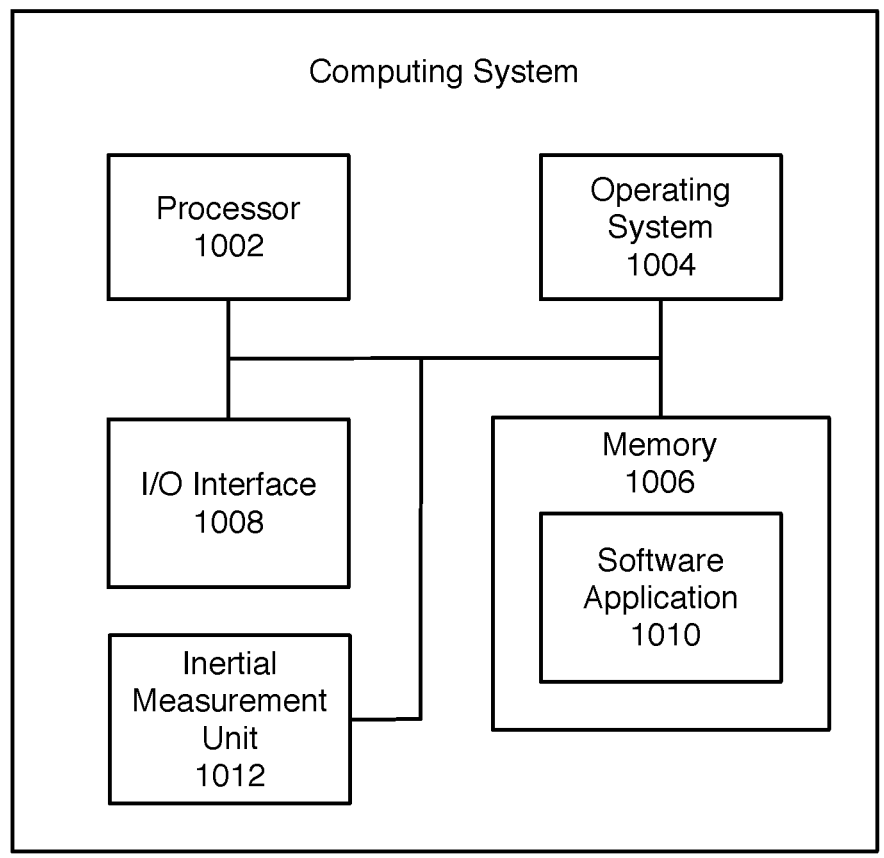
FIG. 10 illustrates a block diagram of an example computing system, which may be used for some implementations described herein.

FIG. 10 illustrates a block diagram of an example computing system 1000, which may be used for some implementations described herein. For example, computing system 1000 may be used to implement neural network 900 of FIG. 9, as well as to perform implementations described herein. In some implementations, computing system 1000 may include a processor 1002, an operating system 1004, a memory 1006, and an input/output (I/O) interface 1008. In various implementations, processor 1002 may be used to implement various functions and features described herein, as well as to perform the method implementations described herein. While processor 1002 is described as performing implementations described herein, any suitable component or combination of components of computing system 1000 or any suitable processor or processors associated with computing system 1000 or any suitable system may perform the steps described. Implementations described herein may be carried out on a user device, on a server, or a combination of both.

Computing system 1000 also includes a software application 1010, which may be stored on memory 1006 or on any other suitable storage location or computer-readable medium. Software application 1010 provides instructions that enable processor 1002 to perform the implementations described herein and other functions. Software application 1010 may also include an engine such as a network engine for performing various functions associated with one or more networks and network communications. The components of computing system 1000 may be implemented by one or more processors or any combination of hardware devices, as well as any combination of hardware, software, firmware, etc.

Computing system 1000 also includes an inertial measurement unit 1012. Inertial measurement unit 1012 is an electromechanical device that measures acceleration forces. Such forces may be static, such as the constant force of gravity pulling at inertial measurement unit 1012. Such forces may be dynamic, caused by moving or vibrating the accelerometer. As indicated above, inertial measurement unit 1012 may be used to detect the direction of gravity, which may be used to determine the motion of a camera.

For ease of illustration, FIG. 10 shows one block for each of processor 1002, operating system 1004, memory 1006, I/O interface 1008, and software application 1010. These blocks 1002, 1004, 1006, 1008, and 1010 may represent multiple processors, operating systems, memories, I/O interfaces, and software applications. In various implementations, computing system 1000 may not have all of the components shown and/or may have other elements including other types of components instead of, or in addition to, those shown herein.

In various implementations, computing system 1000 includes logic encoded in one or more non-transitory computer-readable storage media for execution by the one or more processors. When executed, the logic is operable to perform operations associated with implementations described herein.

Although the description has been described with respect to particular embodiments thereof, these particular embodiments are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer-readable storage medium (also referred to as a machine-readable storage medium) for use by or in connection with the instruction execution system, apparatus, or device. Particular embodiments can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular embodiments may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular embodiments can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What is claimed is:

1. A system comprising:
   one or more processors;
   logic encoded in one or more non-transitory computer-readable storage media for execution by the one or more processors and when executed operable to perform operations comprising:
   capturing a first image of a physical scene with a camera in a first position, wherein the physical scene includes physical feature points;
   capturing a second image of the physical scene with the camera in a second position, wherein the first position and the second position are different;
   determining first image points from the first image;
   determining second image points from the second image;
   determining a first direction of gravity relative to the camera in the first position;
   determining a second direction of gravity relative to the camera in the second position;
   generating a virtual camera having a virtual position, wherein the virtual position of the virtual camera is different from a position of the camera;
   generating a virtual image of the physical scene based on the virtual position of the virtual camera, wherein the virtual image is different from the first image and the second image; and
   determining a motion of the camera between the capturing of the first image and the capturing of the second image, wherein the determining of the motion of the camera is based at least in part on the first image points, the second image points, the first direction of gravity, the second direction of gravity, and the virtual image.

2. The system of claim 1, wherein the logic when executed is further operable to perform operations comprising:
   determining first virtual points from the first image based at least in part on the first image points and the first direction of gravity, wherein the first virtual points correspond to the physical feature points, and wherein virtual positions of the first virtual points are different from positions of the first image points; and
   determining second virtual points from the second image based at least in part on the second image points and the second direction of gravity, wherein the second virtual points correspond to the physical feature points, and wherein virtual positions of the first virtual points are different from positions of the first image points.

3. The system of claim 1, wherein the logic when executed is further operable to perform operations comprising:
   determining first virtual points from the first image;
   determining second virtual points from the second image;
   comparing the first virtual points to the second virtual points;
   determining matched first virtual points and second virtual points; and
   selecting at most two matched first virtual points and second virtual points.

4. The system of claim 1, wherein the logic when executed is further operable to perform operations comprising:
   determining first virtual points from the first image;
   determining second virtual points from the second image;
   comparing the first virtual points to the second virtual points;
   determining matched first virtual points and second virtual points, wherein the matched first virtual points and second virtual points are on a same plane such that the plane is perpendicular to a direction of gravity.

5. The system of claim 1, wherein, to determine the motion of the camera, the logic when executed is further operable to perform operations comprising:
   generating a virtual image of the physical scene and the physical feature points and a direction of gravity; and
   determining the motion of the camera based at least in part on the virtual image.

6. The system of claim 1, wherein a line of sight of the virtual camera is perpendicular to a direction of gravity.

7. The system of claim 1, wherein the determining of the motion of the camera is based on changes in parameter values associated with four degrees of freedom between the first position of the camera when capturing the first image and the second position of the camera when capturing the second image.

8. A non-transitory computer-readable storage medium carrying program instructions thereon, the instructions when executed by one or more processors are operable to perform operations comprising:
   capturing a first image of a physical scene with a camera in a first position, wherein the physical scene includes physical feature points;
   capturing a second image of the physical scene with the camera in a second position, wherein the first position and the second position are different;
   determining first image points from the first image;
   determining second image points from the second image;
   determining a first direction of gravity relative to the camera in the first position;
   determining a second direction of gravity relative to the camera in the second position; and
   generating a virtual camera having a virtual position, wherein the virtual position of the virtual camera is different from a position of the camera;
   generating a virtual image of the physical scene based on the virtual position of the virtual camera, wherein the virtual image is different from the first image and the second image; and
   determining a motion of the camera between the capturing of the first image and the capturing of the second image, wherein the determining of the motion of the camera is based at least in part on the first image points, the second image points, the first direction of gravity, the second direction of gravity, and the virtual image.

9. The computer-readable storage medium of claim 8, wherein the instructions when executed is further operable to perform operations comprising:
   determining first virtual points from the first image based at least in part on the first image points and the first direction of gravity, wherein the first virtual points correspond to the physical feature points; and
   determining second virtual points from the second image based at least in part on the second image points and the second direction of gravity, wherein the second virtual points correspond to the physical feature points.

10. The computer-readable storage medium of claim 8, wherein the instructions when executed is further operable to perform operations comprising:
    determining first virtual points from the first image;
    determining second virtual points from the second image;
    comparing the first virtual points to the second virtual points;
    determining matched first virtual points and second virtual points; and
    selecting at most two matched first virtual points and second virtual points.

11. The computer-readable storage medium of claim 8, wherein the instructions when executed are further operable to perform operations comprising:
    determining first virtual points from the first image;
    determining second virtual points from the second image;
    comparing the first virtual points to the second virtual points;
    determining matched first virtual points and second virtual points, wherein the matched first virtual points and second virtual points are on a same plane such that the plane is perpendicular to a direction of gravity.

12. The computer-readable storage medium of claim 8, wherein, to determine the motion of the camera, the instructions when executed are further operable to perform operations comprising:
    generating a virtual image of the physical scene and the physical feature points and a direction of gravity; and
    determining the motion of the camera based at least in part on the virtual image.

13. The computer-readable storage medium of claim 8, wherein the instructions when executed are further operable to perform operations generating a virtual image of the physical scene and the physical feature points, and wherein a line of sight of the virtual image is perpendicular to a direction of gravity.

14. The computer-readable storage medium of claim 8, wherein the determining of the motion of the camera is based on changes in parameter values associated with four degrees of freedom between the first position of the camera when capturing the first image and the second position of the camera when capturing the second image.

15. A method comprising:
    capturing a first image of a physical scene with a camera in a first position, wherein the physical scene includes physical feature points;
    capturing a second image of the physical scene with the camera in a second position, wherein the first position and the second position are different;
    determining first image points from the first image;
    determining second image points from the second image;
    determining a first direction of gravity relative to the camera in the first position;
    determining a second direction of gravity relative to the camera in the second position; and
    generating a virtual camera having a virtual position, wherein the virtual position of the virtual camera is different from a position of the camera;
    generating a virtual image of the physical scene based on the virtual position of the virtual camera, wherein the virtual image is different from the first image and the second image; and
    determining a motion of the camera between the capturing of the first image and the capturing of the second image, wherein the determining of the motion of the camera is based at least in part on the first image points, the second image points, the first direction of gravity, the second direction of gravity, and the virtual image.

16. The method of claim 15, wherein the method further comprises:
    determining first virtual points from the first image based at least in part on the first image points and the first direction of gravity, wherein the first virtual points correspond to the physical feature points; and
    determining second virtual points from the second image based at least in part on the second image points and the second direction of gravity, wherein the second virtual points correspond to the physical feature points.

17. The method of claim 15, wherein the method further comprises:
    determining first virtual points from the first image;
    determining second virtual points from the second image;
    comparing the first virtual points to the second virtual points;
    determining matched first virtual points and second virtual points; and
    selecting at most two matched first virtual points and second virtual points.

18. The method of claim 15, wherein the method further comprises determining matched first virtual points and second virtual points, wherein the matched first virtual points and second virtual points are on a same plane such that the plane is perpendicular to a direction of gravity.

19. The method of claim 15, wherein, to determine the motion of the camera, the method further comprises:
    generating a virtual image of the physical scene and the physical feature points and a direction of gravity; and
    determining the motion of the camera based at least in part on the virtual image.

20. The method of claim 15, wherein the method further comprises generating a virtual image of the physical scene and the physical feature points, and wherein a line of sight of the virtual image is perpendicular to a direction of gravity.

\* \* \* \* \*